April 24, 1956 E. W. NILSSON 2,742,949
LEVELER APPARATUS AND METHOD
Filed June 5, 1951 9 Sheets-Sheet 1
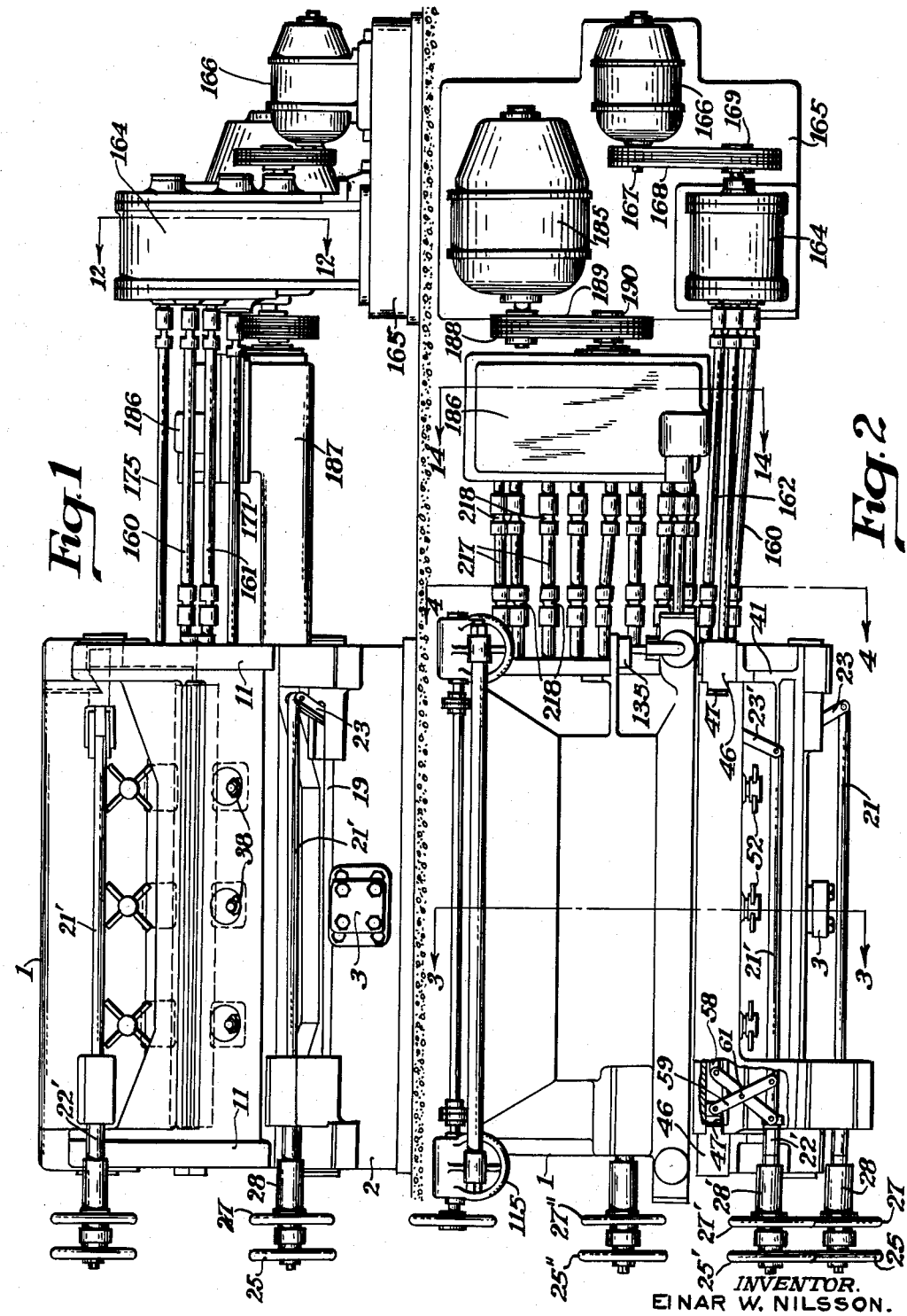
INVENTOR.
EINAR W. NILSSON.
BY
Fay, Schick, Chilton & Isler.
attorneys.

April 24, 1956  E. W. NILSSON  2,742,949
LEVELER APPARATUS AND METHOD
Filed June 5, 1951  9 Sheets-Sheet 2

INVENTOR.
EINAR W. NILSSON.
BY Fay, Gobrick, Chilton & Isler.
attorneys.

April 24, 1956     E. W. NILSSON     2,742,949
LEVELER APPARATUS AND METHOD
Filed June 5, 1951     9 Sheets-Sheet 3
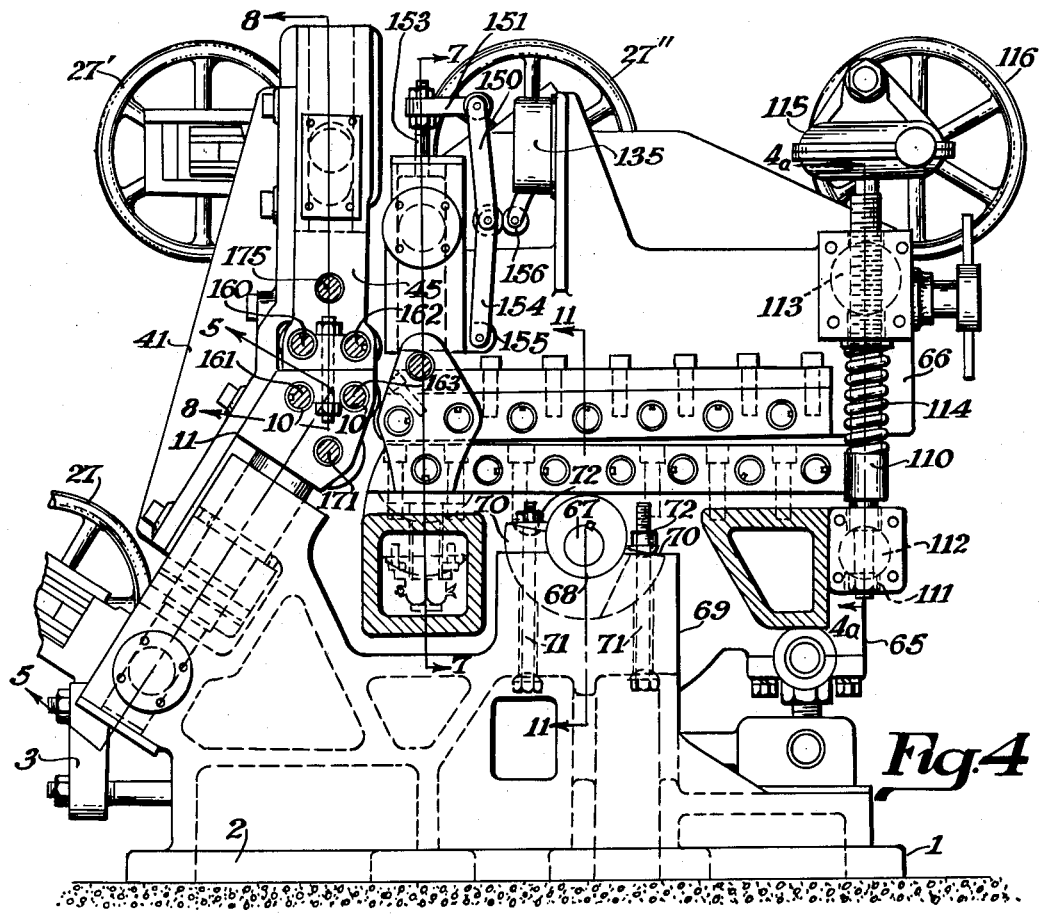
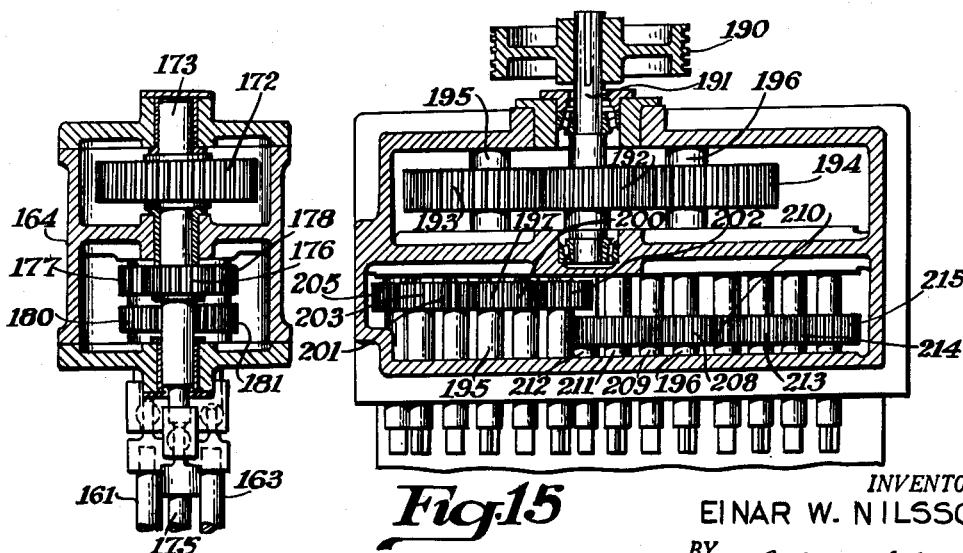
INVENTOR.
EINAR W. NILSSON.
BY
Fay, Gobrick, Chilton & Isley
Attorneys.

April 24, 1956     E. W. NILSSON     2,742,949
LEVELER APPARATUS AND METHOD

Filed June 5, 1951     9 Sheets-Sheet 4

INVENTOR.
EINAR W. NILSSON.
BY Fay, Schick, Chilton & Isler.
attorneys.

April 24, 1956     E. W. NILSSON     2,742,949
LEVELER APPARATUS AND METHOD
Filed June 5, 1951     9 Sheets-Sheet 5

INVENTOR.
EINAR W. NILSSON.
BY Fay, Golrick, Chitton & Isler.
Attorneys.

April 24, 1956 — E. W. NILSSON — 2,742,949
LEVELER APPARATUS AND METHOD
Filed June 5, 1951 — 9 Sheets-Sheet 6
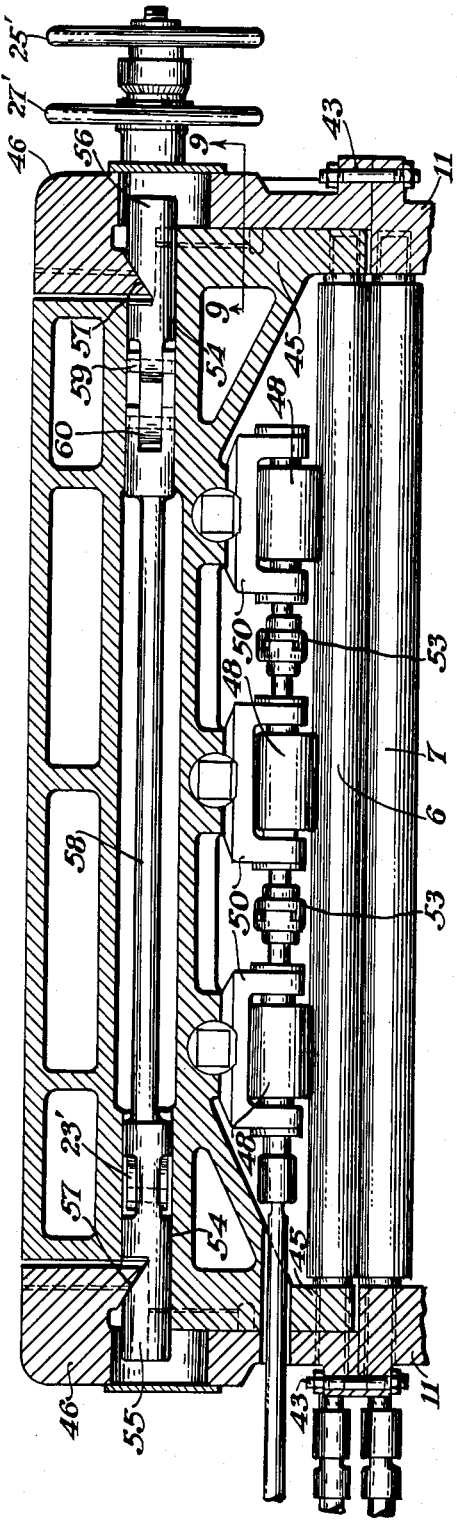
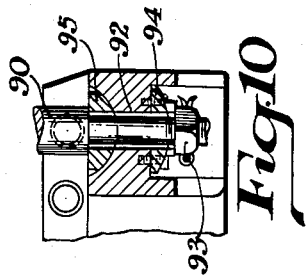
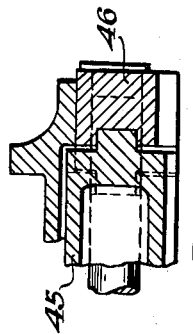
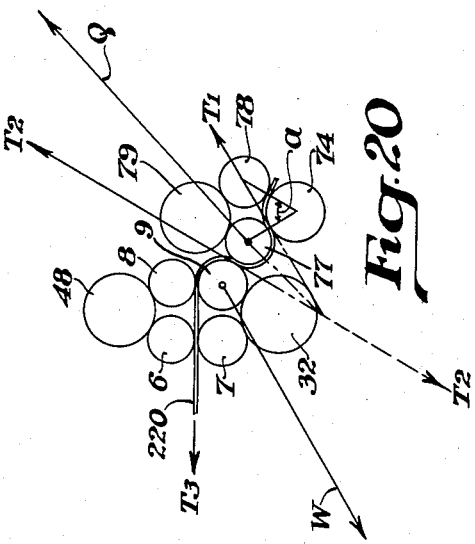
INVENTOR.
EINAR W. NILSSON.

INVENTOR.
EINAR W. NILSSON.

INVENTOR.
EINAR W. NILSSON
BY
Attorney

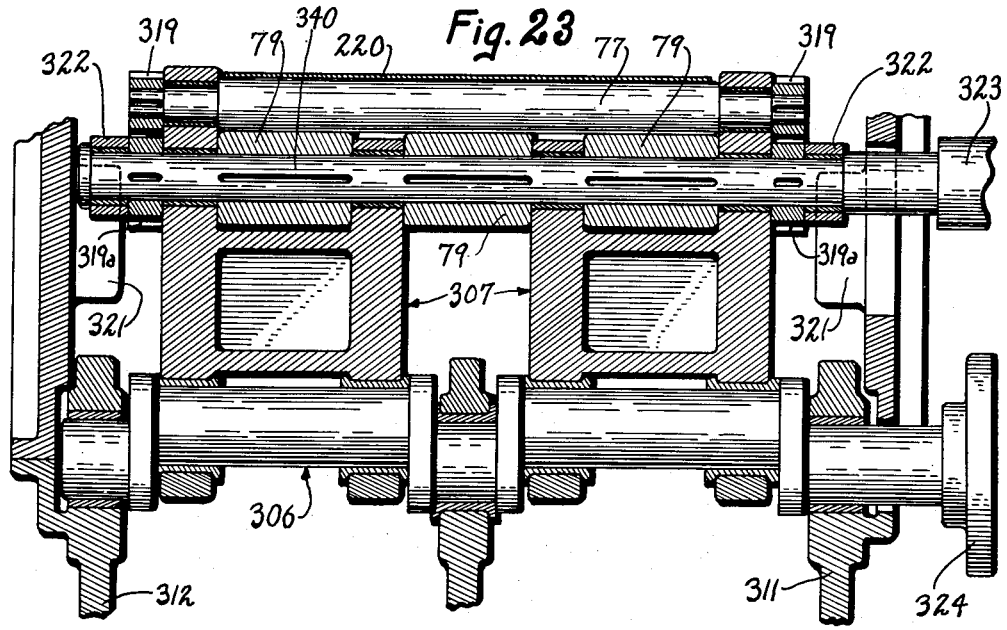
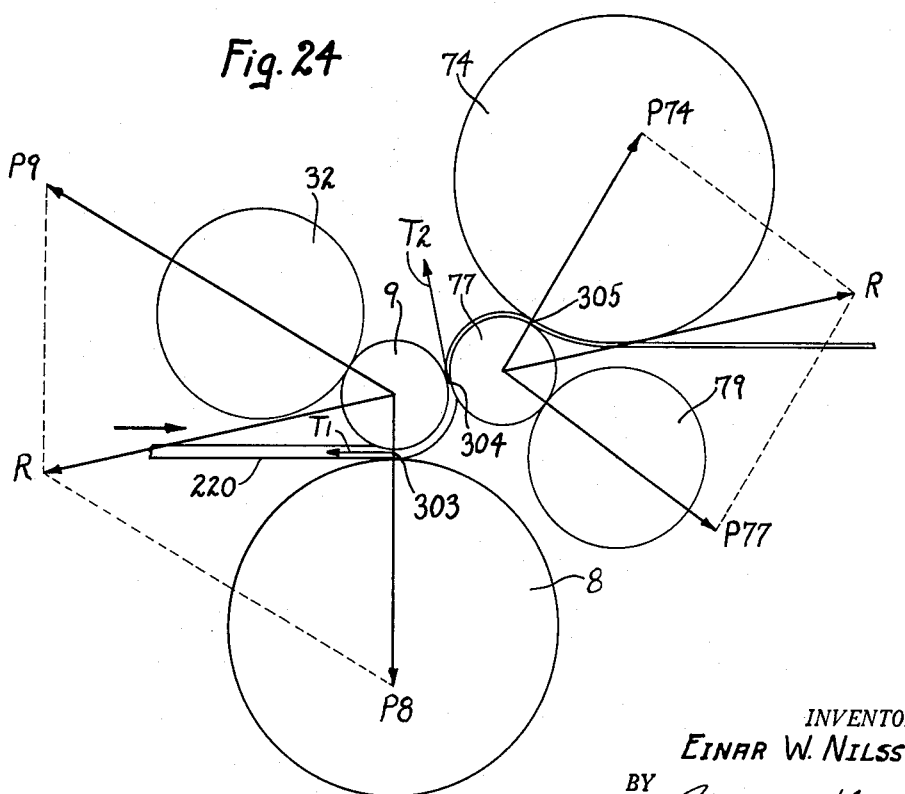

United States Patent Office 2,742,949
Patented Apr. 24, 1956

2,742,949

LEVELER APPARATUS AND METHOD

Einar W. Nilsson, Youngstown, Ohio

Application June 5, 1951, Serial No. 229,889

25 Claims. (Cl. 153—90)

The present invention relates to an improved apparatus and method for sheet leveling in the production of metal sheets.

It has been the practice heretofore, in the manufacture of metal sheets, to remove undesirable internal stresses, bulges, wrinkles and similar defects by rolling the sheets between sets of rollers arranged to cause flexing and smoothing of the sheets. This method of leveling is not entirely satisfactory because sufficient flexing and pressure cannot be applied on the rollers to remove certain internal stress and unevenness in the sheets. Also, the rollers are liable to create wrinkles in the sheets under certain conditions, particularly where severe bulges are present.

Another method of sheet leveling is practiced in which opposite ends of the sheet to be leveled are clamped in a stretching machine and the sheet stretched beyond its limit of elasticity. This method of leveling sheets is not wholly desirable as the surface of the sheets are not as smooth as when rolled under ideal conditions, and it is a relatively slow process.

One object of my invention, therefore, is to provide a new and improved apparatus and method of leveling sheets, particularly wherein the sheets are flexed and stretched beyond their limits of elasticity and rolled in one continuous operation.

A further object of the invention is to provide an apparatus for leveling sheets which comprises two sets of rollers and means for applying tension to the portion of a sheet passing from one set of rollers to the other.

A still further object of the invention is to provide a leveler apparatus similar to that of the preceding paragraph in which one set of rollers is tilted toward the other set, after the sheet is fed to the second set of rollers, so that the sheet will be flexed in a substantially S form and stretched beyond its limit of elasticity and its surfaces compressed in passing from one set of rollers to the other set.

Another object of the invention is to provide a sheet leveler apparatus as described in the preceding paragraph in which the rollers for passing the sheets through the apparatus are driven at relatively equal peripheral speeds.

Still another object of the invention is to provide a sheet leveler apparatus having two sets of rollers through which a sheet to be leveled is passed, one set of rollers being deflectable for applying tension on the portion of the sheet passing between the sets of rollers, and providing a support for one of the sets of rollers, which support is yieldable in substantially the direction the sheet is stretched by the deflected set of rollers.

A further object of the invention is to provide a leveler apparatus for continuous processing of metal strip of any length, such apparatus comprising two sets of rolls, one set being driven at a greater peripheral speed than the other set, the sheet being contraflexed in its passage from one roll set to the other and the construction being such that the sheet is subjected to maximum tension and compression at the point of contraflexure to thoroughly work the metal at this point.

Other objects and advantages of my invention will be apparent from the following description of preferred forms of my invention, reference being made to the accompanying drawings wherein:

Fig. 1 is a front view in elevation of a sheet leveling apparatus;

Fig. 2 is a plan view in elevation of the mechanism shown in Fig. 1;

Fig. 4 is a view in section taken substantially on line 4—4 of Fig. 2;

Fig. 4a is a view in section taken on line 4a—4a of Fig. 4;

Fig. 5 is a view in section taken on line 5—5 of Fig. 4;

Fig. 6 is a view taken on line 6—6 of Fig. 5;

Fig. 8 is a view in section taken on line 8—8 of Fig. 4;

Fig. 9 is a view in section taken substantially on line 9—9 of Fig. 8;

Fig. 10 is a view in section taken on line 10—10 of Fig. 7;

Fig. 13 is a view in section taken on line 13—13 of Fig. 12;

Fig. 15 is a view in section taken on line 15—15 of Fig. 14;

Fig. 20 is a diagrammatic illustration of the action of certain forces during a sheet leveling operation;

Fig. 23 is a section generally corresponding to the line 23—23 of Fig. 22;

Fig. 24 is an enlarged fragmentary diagrammatic view of certain parts shown in Figs. 22 and 23;

Figure 3:
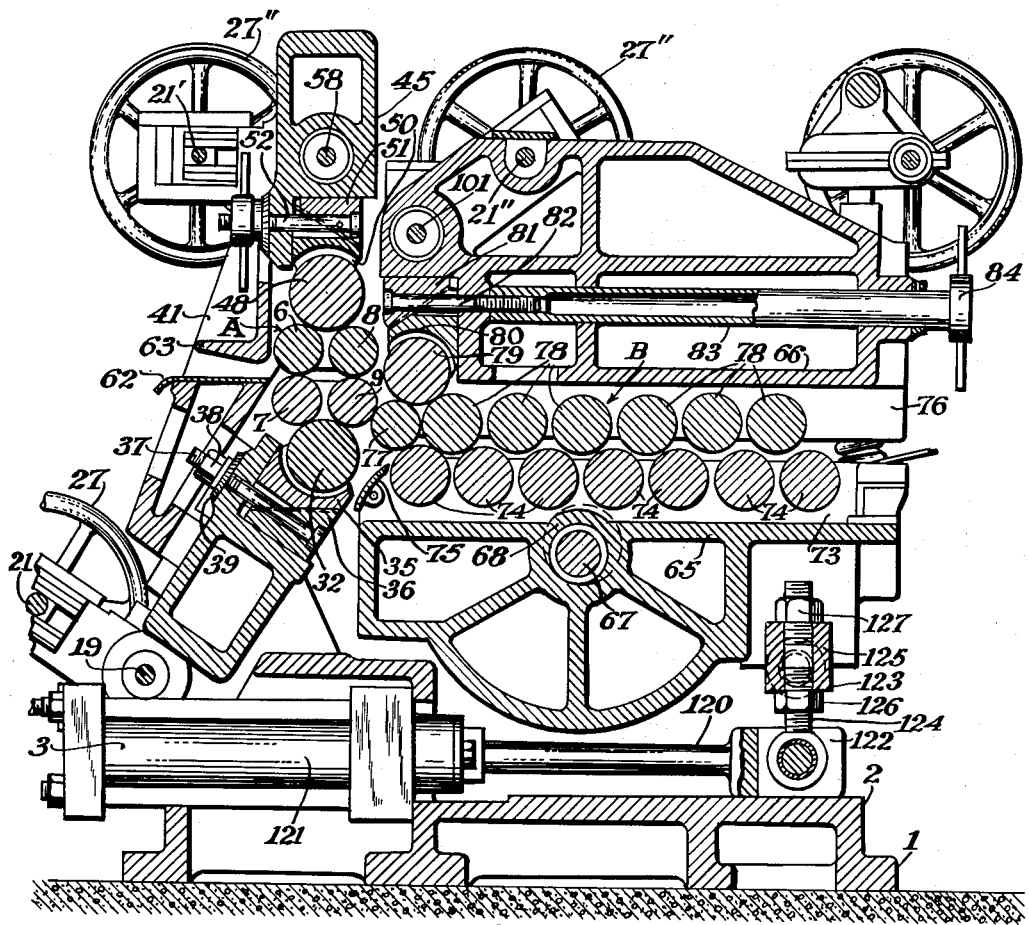
Fig. 3 is a view in section taken substantially on line 3—3 of Fig. 2.

This application is a continuation-in-part of an application filed by me on December 4, 1944, Serial Number 566,633, and entitled, "Leveler Apparatus and Method," now abandoned.

Referring more particularly to Figs. 1 to 4 of the drawings, I have shown a sheet leveler apparatus, indicated generally at 1, which is a preferred form of my invention, although it is to be understood that the invention could be embodied in other forms of apparatus, if desirable, and yet come within the scope of my invention. The apparatus comprises, generally, a base 2 on which is mounted a set of pinch rollers A, a set of main leveler rollers B, which set is tiltable, and a hydraulic mechanism, indicated generally at 3, for tilting the set of main leveler rollers.

The pinch roller set, which is located at the forward end of the apparatus, consists of two pairs of driven rollers 6 and 7 and 8 and 9. The lower rollers 7 and 9 are journalled in bearings 10 in two oppositely disposed heads 11. Referring to Fig. 5, the heads 11 are mounted so that they can yield in a direction downwardly and forwardly, and in the present embodiment of the invention the heads are provided with piston-like stems 13 which are slidingly supported in cylinders 14 carried by the base 2. The lower ends of the stems 13 are sloped to cooperate with wedges 15 and 16, which wedges are slidable in cylinders that extend at right angles to cylinders 14. The wedges 15 and 16 are resiliently urged outwardly, as viewed in Fig. 5, for yieldingly wedging the stems 13 upwardly. The mechanism for urging the wedges 15 and 16 outwardly includes a link 17 connected at one end to the wedge 15 and a link 18 connected to a rod 19 which is in turn connected with a wedge 16. As illustrated in Fig. 6 the links 17 and 18 are pivotally connected by a pin 20 and the outer end of link 18 is connected to a rod 21 and the outer end of link 17 is connected to a sleeve 22 on the rod 21. One end of the rod 21 is supported by a link 23 pivotally connected at opposite ends to rods 19 and 21, respectively. The other end of rod 21 extends beyond the sleeve and is threaded for receiving an internally threaded hub 24 of a wheel 25. A coil spring 26 is interposed between the end of the sleeve 22 and the hub 24, thus tending to draw the outer ends of links 17 and 18 together, which results in an outward thrust on the wedges 15 and 16.

The degree of resiliency of the support for the roller supporting heads 11 can be adjusted by rotation of wheel 25 on the rod 21, for changing the compression on spring 26.

Adjustment is also provided for limiting the downward movement of the stems 13 by a wheel 27 having its hub 28 threaded over the sleeve 22. The outer end of hub 28 is engageable with the hub 24, thereby limiting the spread of the upper ends of links 17 and 18. Preferably, a micrometer dial 29 is mounted on hub 24 and cooperates with indicia on the hub 28 for indicating this adjustment.

To provide a safety factor for relief of the rollers in the event an abnormal thickness of material should come between the rollers, or should an abnormal load be placed on rollers 7 and 9, by a condition to be described hereinafter, the pin 20 for pivoting the links 17 and 18 is such that it will shear before the rollers 7 and 9 are damaged. This, of course, will release the wedges 15 and 16 to allow the heads 11 to drop.

Three backing up rollers 32 for rollers 7 and 9 are supported by a bridging member 33 which is attached to the stems 13 by the latter passing through openings in the ends of the member 33, and nuts 34, threaded on the stems 13, adjustably position the member 33. Each roller 32 is journalled at its ends in a U-shaped frame 35 and, as illustrated in Fig. 3, the frames 35 are supported on wedges 36, which wedges are each adjustably positioned by a bolt 37 extending from the rear of wedge 36 through openings in the wedge, frame 35 and member 33, and a nut 38 is threaded on the outer end of the bolt. Preferably, a dial 39 is attached to the nut and has indicia thereon for indicating the adjustment of the nut by reference to a mark on the member 33. The backing up rollers 32 are adapted to be driven and for this purpose they are interconnected by drive shafts and flexible couplings, indicated at 42 and a universal connection 42'. The flexible and universal connections allow for misalignment of the rollers 32.

Referring to Figs. 4 and 8, the rollers 6 and 8 are journalled in bearings in a yoke member 45, which member is slidably supported at its ends by uprights 46. The uprights 46 are secured to the heads 11 by bolts 43 and web members 41. The yoke member 45 is slidable vertically along guides 47 formed on the uprights, which guides cooperate with the sides of vertical slots formed in the yoke 45. Three backing rollers 48 are provided for rollers 6 and 8 and are supported by U-shaped members 50 which are secured to the yoke structure by wedge blocks 51 and bolt mechanisms 52, which mechanisms are similar to the blocks 36 and bolts 37 and nuts 38 described with reference to the rollers 32. Thus, the pressure of the rollers 48 on rolls 6 and 8 can be regulated by the nuts of the mechanisms 52. The rollers 48 are adapted to be power driven and they are interconnected by drive shafts and flexible couplings 53, the flexible couplings allowing some misalignment of the rollers 48.

Mechanism similar to that described with reference to the heads 11 is provided for yieldingly resisting vertical movement of member 45. The member 45 is provided with cylindrical portions 54 at opposite ends in which wedge blocks 55 and 56 are located. The wedge blocks are provided with sloping faces 57 which cooperate with complementary faces formed on the uprights 46. The wedge blocks 55 and 56 are drawn inwardly by a spring that operates mechanism similar to the mechanism described with reference to the wedge blocks 15 and 16, except that in the present instance the wedges are drawn inwardly instead of urged outwardly. Wedge 55 is connected with a rod 58 and wedge 56 is connected with a link 59. Rod 58 is connected with a link 60 which is pivotally connected to link 59 by pin 61. Link 59 is connected to a rod 21' and link 60 is connected to a sleeve 22' on the rod 21'. The rod 21' and sleeve 22' are similar in all respects to the rod 21 and sleeve 22, described hereinbefore, and they are resiliently urged in opposite directions by a spring actuated mechanism in the same manner as that described with reference to rod 21 and sleeve 22. As may be seen in Fig. 2, the links 59 and 60 are pivoted by the pin 61 so that the ends thereof, connected to rod 58 and wedge 56, urge the wedges toward the sloping faces on the uprights 46. The spring acting on the rod 21' and sleeve 22' is adjustable by a wheel 25' that is similar to wheel 25. Also, the inward movement of the wedges 55 and 56 is limited by a wheel 27' that corresponds in function to wheel 27. The rod 21' is supported at one end by a link 23' pivotally connected at its end to rod 21' and the wedge block 55.

A feed table 62 and guide 63, which are best seen in Fig. 3, extend coextensive with rollers 6 and 7 for feeding metal between these rollers.

Referring now to Figs. 3 and 4, the set of main leveler rollers is comprised of lower and upper sections 65 and 66. Section 65 consists of a frame that is tiltable about a transversely extending axle 67. Each end of the axle is mounted eccentrically in a bearing 68, which bearing is supported in uprights 69 of the base 2. The position of the frame 65 relative to the pinch rollers 6, 7, 8 and 9 may be adjusted somewhat by the angular position of the bearing 68, and to provide for such adjustment there are laterally projecting shoulders 70, which shoulders are slotted to accommodate bolts 71. The bolts 71 extend upwardly from the base 2 and have nuts 72 threaded thereon. By placing the bearing 68 in the proper angular position and tightening the bolts 71, the position of frame 65 relative to the pinch rollers can be fixed as desired.

The frame 65 carries side members 73 in which the ends of seven rollers 74 are journalled. The rollers 74 are the lower rollers for the main roller leveler set. A deflector plate 73 is mounted at the left-hand end of the frame 65 and transversely thereof for directing the sheets between the upper and lower rollers of the main leveler rollers. These rollers and the pinch rollers described hereinbefore are all driven at relatively equal peripheral speeds in a manner to be described.

The upper section 66 includes a frame having sides 76, in which the ends of rollers 77 and 78 are journalled. Mounted on this frame are three rollers 79, which appear in Fig. 7, for backing up roller 77 and the next adjacent roller 78. These rollers 79 are each journalled in a U-shaped frame 80, which frames are secured to the frame 66 by wedge blocks 81 and bolts 82. As may be seen in Fig. 3, an internally threaded tube 83 extends from the right-hand end of the frame and is threaded on the bolts 82 for drawing the bolts inwardly, thereby wedging the frames 80 downwardly. Preferably, the rods 83 are provided with hand wheels 84 for facilitating rotation thereof. It will be observed that the mechanism for pressing the roller 79 to the lower rollers is similar to that described with reference to the backing rollers 32 and 48.

Figure 7:
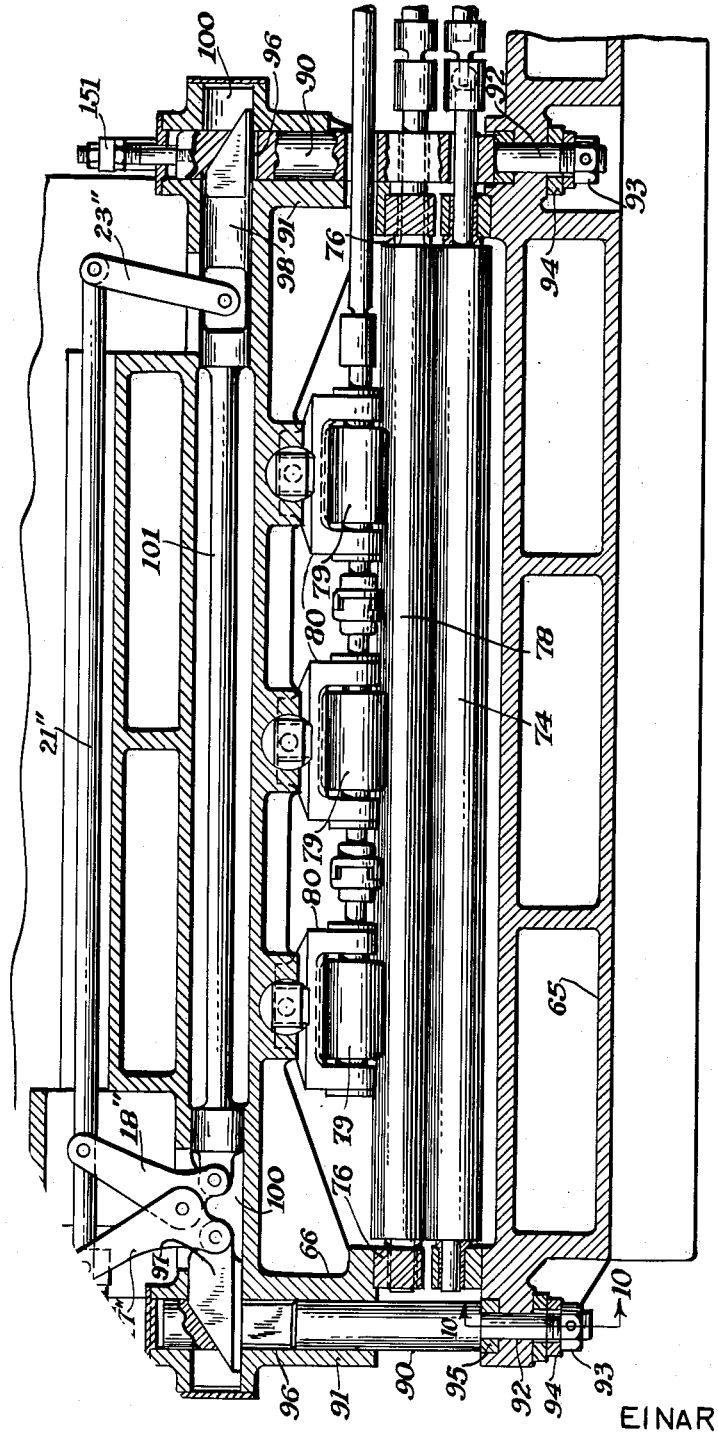
Fig. 7 is a view in section taken on line 7—7 of Fig. 4.

Referring to Fig. 7, the front end of frame 66 is connected with the frame 65 by pistons 90 which slide in cylinders 91 formed in the frame. The lower ends of the pistons 90 have reduced portions that loosely extend through bores 92 formed in the frame 65 and are secured in the bores by nuts 93 threaded on the pistons. Washers 94, which are curved as shown in Fig. 10, are interposed between the nuts 93 and the frame 65 and similar washers 95 are interposed between the shoulders formed on the lower ends of the pistons 90 and the portions of the frame 65, through which the pistons 90 pass. Thus, the pistons may rock slightly. The upper portions of the pistons 90 have transversely extending slots 96, through which wedge blocks 97 and 98 extend. The upper surfaces of the slots 96 are sloped complementarily to the sloped faces of the wedges 97 and 98 and the wedges slide in cylinders 100 formed in the frame 66. The wedges 97 and 98 are urged outwardly by mechanism similar to the mechanism for urging the wedges 15 and 16 outwardly, and the respective elements of this mechanism are indicated by the same reference numerals, but distinguished therefrom by double primes. Thus, wedge 98 is connected with link 18″ by a rod 101. The link 17″ is connected with wedge 97. By this arrangement the rollers 77 and 78 are yieldingly held against roller 74, and when a sheet is fed between the upper and lower rollers, the upper rollers are raised, but not without exerting pressure on the sheet passing therethrough.

The frame 66 is connected with frame 65 at the rear portion thereof by rods 110, which may be seen in Fig. 4, one rod being located on each side of the frames. The lower ends of the rods 110 are threaded and each has a nut 111 thereon. The nuts 111 secure the lower ends of the rods 110 in cylindrical blocks 112, which are pivotally secured to the frame 65. The upper ends of the rods 110 are threaded in blocks 113, which blocks are cylindrical and are pivotally connected with the frame 66. Compression springs 114 are interposed between shoulders on rods 110 and washers resting on frame 66 for yieldingly supporting the rear end of frame 66. The rods 110 are rotated simultaneously to adjust the position of frame 66 with respect to the frame 65 by a worm gear mechanism, indicated generally at 115, which mechanism is operated by a wheel 116.

The frames 65 and 66 are tiltable by a hydraulically operated piston 120, shown in Fig. 3, which is reciprocated in a cylinder 121. The outer end of the piston rod carries a yoke 122 and a link 123 interconnects the yoke 122 and the frame 65. Preferably, the link 123 is adjustable in length, and for this purpose I have shown the link as comprising a threaded rod 124 which extends through a sleeve 125, which sleeve is pivotally attached to the frame 65. Nuts 126 and 127 are threaded on the rod 124 and are adjustable on the rod for positioning the sleeve 125 relative to the yoke 122. Preferably, the frames 65 and 66 are so balanced about the axle 67 that the main leveler roller set always tends to rotate clockwise about the axle, as viewed in Figs. 3 and 4, whereby there will be no lifting tendency on the piston 120. This balancing may be effected by placing suitable weights on the frames. The hydraulic system for tilting the main leveler rollers has sufficient power to cause, in conjunction with the flexing of sheets of metal passing from the pinch rollers to the main rollers, stretching of the sheet beyond the limit of elasticity of the sheets.

Figure 16:
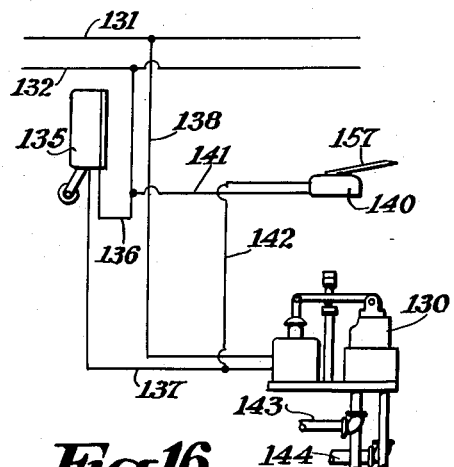
Fig. 16 is a diagrammatic illustration of a control mechanism and circuit for a hydraulic cylinder of the sheet leveling apparatus.

The operation of the hydraulic mechanism 3 is controlled by a solenoid operated valve 130, the circuit for which is shown in Fig. 16. The circuit includes suitable power supply lines 131 and 132, and a switch 135 connected with line 132 by wire 136 and with the valve 130 by wire 137. The valve 130 is connected with line 131 by a wire 138. A second switch 140 also controls operation of the valve 130 and switch 140 is connected to line 132 by wires 136 and 141 and with the valve 130 by wire 142 and wire 137.

When the valve 130 is energized fluid is fed to the cylinder 121 through pipe 143 for forcing the piston 120 outwardly and the fluid forced from the cylinder by this movement of the piston is returned to the hydraulic system through pipe 144. The hydraulic system is not shown because such systems are well known. When valve 130 is deenergized, fluid is fed through pipe 144 to the cylinder 121 for forcing the piston in the opposite direction and liquid returns to the reservoir of the hydraulic system through pipe 143. Thus, the main leveler rollers will be tilted to the position shown in Fig. 17 when the valve 130 is deenergized, and to the position shown in Figs. 3, 4, 19 or 21 when the valve 130 is energized.

Switch 135 is closed as a sheet enters between rollers 74 and 77 by toggle mechanism, shown in Fig. 4, including a link 150 pivotally connected at one end to an arm 151 that is attached to a rod 153, fixedly secured to one of the pistons 90, as shown in Fig. 7, so that one end of link 150 is fixed relative to the frame 65. A link 154 is pivotally connected at one end to the link 150 and at the other end to a bracket 155 on the frame 66. When the rollers 74 and 77 are in contact the links 150 and 154 are slightly out of alignment and when a sheet is fed between the two rollers the joined ends of the links are moved laterally against a lever 156 which closes the switch 135.

The switch 140, which is shown only diagrammatically, is located on the frame 65 adjacent the rear thereof, and lever 157 extends in the path traveled by sheets passing through the rollers. The pressure of a sheet on the lever 157 maintains the switch closed until the lever 157 is released by the passing of the sheet, at which time the switch is opened.

As previously stated, each of the rollers of the apparatus is driven at equal peripheral speeds. Referring to Figs. 1, 2 and 3, rollers 6, 7, 8 and 9 are driven by shafts 160, 161, 162 and 163 which are rotated by a gear box 164. The gear box is driven by an electric motor 166 through a pulley 167, belt 168 and pulley 169 of the gear box. The motor and gear box are mounted on a platform 165, as may be seen in Figs. 1 and 2. The pulley 169 drives a shaft 170 on which a pinion 171 is mounted and the pinion 171 drives a gear 172, which gear is mounted on a shaft 173. The gear 172 drives a similar gear 174, the latter being keyed to shaft 175. A pinion 176 is keyed to shaft 173 and drives gears 177 and 178, which are keyed to shafts 161 and 163, respectively. A gear 179 is keyed to shaft 175 and drives gears 180 and 181, which gears are connected to shafts 160 and 162, respectively. Shafts 173 and 175 are connected with the backing-up rollers 32 and 48, respectively.

Figures 12, 14:
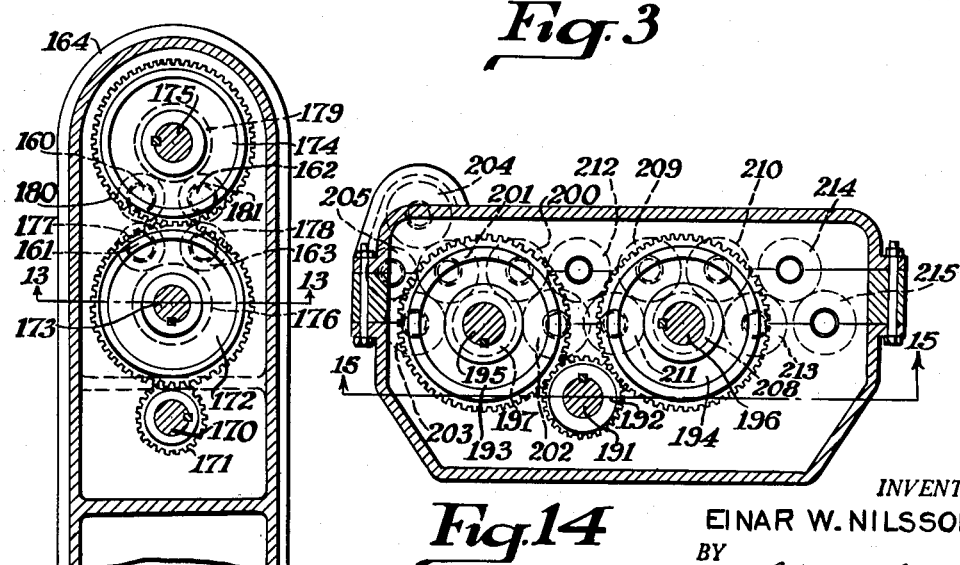
Fig. 12 is a view in section taken on line 12—12 of Fig. 1.
Fig. 14 is a view in section taken on line 14—14 of Fig. 2.

Rollers 74, 77 and 78, together with the backing-up roller 79, are driven by an electric motor 185 through a gear box 186. The gear box 186 is mounted on a laterally extending platform 187 carried by the frame 65 and tiltable therewith, and the motor 185 drives the gear box through motor pulley 188, belt 189 and gear box pulley 190. Motor 185 is mounted on platform 165. Referring now to Figs. 14 and 15, the pulley 190 drives a shaft 191 to which a pinion gear 192 is keyed, and gear 192 drives two gears 193 and 194 which are keyed to shafts 195 and 196, respectively. A gear 197 is keyed to shaft 195 and meshes with gears 200 and 201. Gear 200 meshes with gear 202 for driving the latter in the opposite direction from that of gear 200. Gear 201 meshes with gear 203 for driving the latter in the opposite direction and also meshes with gear 204. Gear 203 meshes with gear 205. A gear 208 is keyed to shaft 196 and meshes with gears 209 and 210. Gear 209 meshes with a gear 211, and gear 211 meshes with gear 212. Gear 210 meshes with gear 213, which is meshed in the gear 214. Gear 214 meshes with gear 215. The shafts on which gears 200, 201, 209, 210, 212 and 214 are keyed drive the upper rollers 78. Gear 205 is keyed to a shaft driving the roller 77 and gear 204 is geared to a shaft that drives the backing-up rollers 79. The lower rollers 74 are driven by shafts on which are keyed gears 197, 202, 203, 208, 211, 213 and 215. These shafts include shafts 195 and 196. It will be understood that the diameters of the various gears are such that the peripheral speeds of the rollers driven therethrough are relatively equal. The shafts extending from the gear box 186 for driving the rollers are indicated generally at 217, and, preferably, each shaft includes two universal joints 218. The axis of shaft 191, on which gear 192 is mounted, is aligned with the axis of axle 67 so that when the leveler rollers are tilted, they pivot about the axis gear 192.

Preferably, motors 166 and 185 are electrically interlocked so that they rotate at relatively equal speeds regardless of differences in loading thereof so that the relative peripheral speeds of the rollers in sets A and B will always be substantially equal. This interlocking is effected by means well known in the art and it is therefore not shown. Also, the motors are adjustably positioned for maintaining proper tension on the belts driven thereby. However, particularly in the event of processing coils or sheets of greater length in such a manner that permanent deformations take place resulting in reduced thickness and elongation of the strip or sheet, it will be desirable to provide suitable driving mechanism for causing the speed of later engaged rollers to be increased to correspond to the elongation of the sheet, as is common in sheet handling equipment. This refers specifically to roll 77 and those thereafter.

Figure 17:
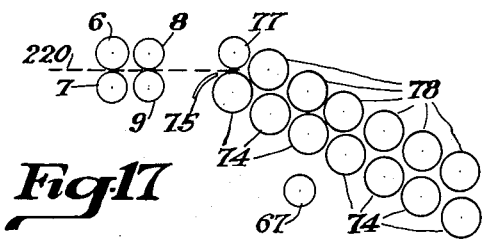
Figs. 17, 18 and 19 are diagrammatic illustrations of the relative positions of the various elements of the sheet leveling apparatus during a sheet leveling operation.
Figure 18:
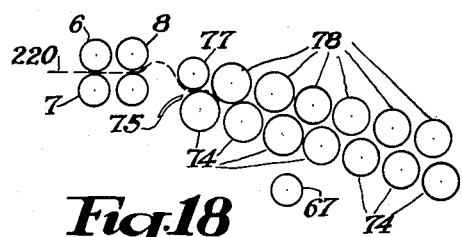
Figure 19:
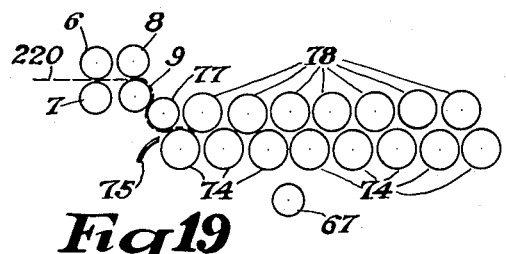

The operation of the apparatus is as follows: The main leveler rollers 74, 77 and 78 are tilted as shown in Fig. 17 when the apparatus is at rest. The motors 166 and 185 are started and a sheet to be leveled is fed between the pinch rollers. The sheet, indicated at 220, passes horizontally from the pinch rollers and enters between rollers 74 and 77, causing the frame 66 carrying the upper sets of rollers to be raised, whereby the switch 135 is closed, causing the piston 120 to be operated to tilt the frames 65 and 66 counterclockwise, as viewed in Fig. 18. This motion brings rollers 74 and 77 toward the pinch rollers, causing the sheet 220 to deflect, as shown in Fig. 18. As the frames are tilted to bring the main leveler rollers into the position shown in Fig. 19, the bulge, or deflected part of the sheet, is taken up and the pressure of the roller 77 bearing downwardly on the sheet is such that the portion of the sheet between rollers 9 and 77 is stretched beyond its elastic limit. Also, it will be noticed that the sheet is wedged between rollers 9 and 77. Thus, as the sheet passes through the apparatus successive portions are stretched and at the same time the stretched area is compressed to cause effective leveling and relief of internal stresses throughout the entire cross-sectional area of the sheet. The force of the roller 77 on the sheet 220 in the downward direction not only places a tension on the sheet intermediate the reverse curve formed in the sheet by rollers 9 and 77, but it also creates a shearing force at that portion of the sheet longitudinally of the sheet. This shear force is caused by one surface of the sheet frictionally engaging the roller 9 and the opposite surface frictionally engaging roller 77 and having a downward force exerted thereon by the tilting of the roller frames. These compression and shearing forces have a tendency to preserve the elongation of the outer side of the sheet curved about roller 9 as the sheet is subsequently flexed in the opposite direction about roller 77. These combined forces tend to flatten and stress the sheet in all directions and completely relieve all internal stresses in a most efficient manner.

The tension on the sheet may be adjusted by regulating the length of link 124 and by adjusting the bearings 68 for the axle of frame 65. If the tension is too great, the heads 11 will yield downwardly in substantially the direction in which the sheet is stretched by the roller 77, thereby averting damage to the rollers 9 and 77 on the sheet.

Referring to Fig. 20, it will be seen that the greatest tension on the sheet 220 will be applied along T–2 and a lesser tension will be applied in the direction of T–1 and T–3. It will also be noticed that a force will be applied to the roller 9 approximately in the direction indicated by W and a reacting force on the roller 77 in the direction indicated by Q. As the sheet passes rearwardly through the main leveler rollers, flexing of the sheet is decreased as the sheet passes through the roller since the rearward rollers 74 and 78 are spaced further apart vertically. After the sheet has passed beyond rollers 74 and 77 the upper frame 66 may drop sufficiently to cause switch 135 to be opened. The solenoid valve 130 is maintained energized, however, by switch 140, which is closed by the passage of the sheet over the lever 157 thereof until the sheet is free of the rollers. Upon opening of the switch 140 the solenoid valve is deenergized and the frames carrying the main leveler rollers are tilted to the position shown in Fig. 17 and another sheet may then be processed.

It may be desirable to halt rotation of the rollers after the sheet has entered between rollers 74 and 77 until the frames 65 and 66 have been tilted forward, but in the present embodiment I prefer to operate the rollers continuously.

It will be seen from Fig. 20 that rollers 6 and 7 in gripping the sheet will wedge themselves between backing up rollers 32 and 48 as the tension T–3 on the sheet increases, and roller 78 will wedge itself between roller 74 and rollers 79 when tension T–1 increases. Similarly, tension T–2 will wedge roller 9 between rollers 8 and 32, and roller 77 between roller 74 and 79. Thus the gripping force will actually increase, the more the sheet pulls, and as all rollers, or at least the more important ones, are driven they will all have a tendency to work together and distribute the horsepower required to overcome the friction, additional gear loads, etc., caused by these pressures and the tension on the sheet.

It will be apparent that the sheets are given a rolling treatment for smoothing out wrinkles, bulges, and the like, on the surface of the sheets and the stretching and flexing of the sheet between the two sets of rollers as the sheet passes through the machine relieves internal stresses and also levels the sheet. Thus, I have provided a machine which combines both roller and stretcher leveling of a sheet and which produces stretching and rolling in one continuous operation so that only a single handling of the sheet is necessary.

Figure 21:
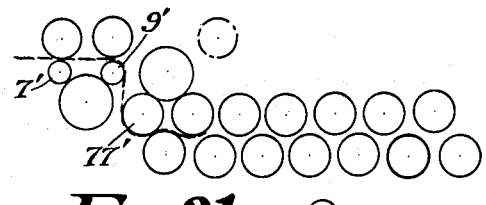
Fig. 21 is a diagrammatic illustration of a modification in the rollers of the sheet leveler mechanism.
Figure 11:
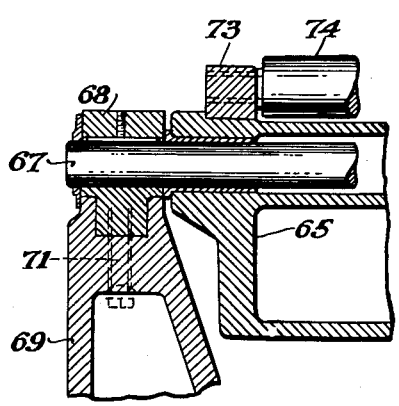
Fig. 11 is a view in section taken on line 11—11 of Fig. 4.

It is to be understood that rollers corresponding in function to the rollers shown but having different diameters may be used in the apparatus and one example of such an arrangement is indicated in Fig. 21. In this figure pinch rollers 7' and 9' are relatively smaller than roller 77' and there is no wedging of the sheet between the latter two rollers. The sheet, however, is stretched and flexed beyond its limit of elasticity.

By providing bearings and driving gears for the rollers 8, 9, 74 and 77 of sufficient strength, sufficient tension can be applied on the sheet passing between the pinch rollers 8 and 9 and the rollers 77 and 74 to stretch the sheet beyond its limit of elasticity without the necessity of flexing the sheet at the same time.

Figure 22:
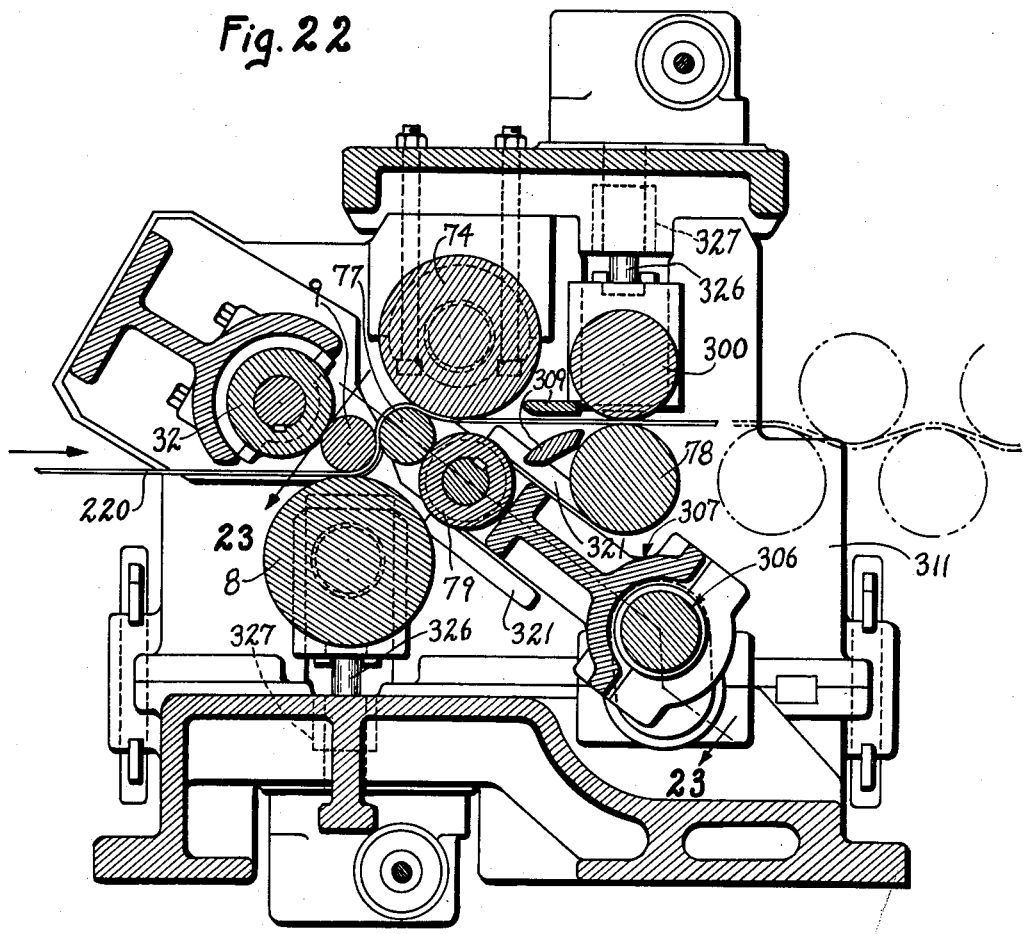
Fig. 22 is a longitudinal sectional view through apparatus illustrating another embodiment of my invention.

Referring particularly to Figures 22 and 23, the invention disclosed therein provides a simpler arrangement of the apparatus, with additionally effective backing-up of the rollers and particularly effective means for bringing the rollers into working position, and the disclosed arrangement makes it possible to use the apparatus for the continuous processing of metal strip of any length. Since many parts are similar to parts hereinbefore described, like reference numerals will be used to refer to at least certain of such parts.

In the form of the invention shown in Figures 22 and 23, rollers 74, 77, 79, 78, 300, and any rollers thereafter rotate at a slightly greater circumferential speed than rollers such as 8, 9, and 32, and the rollers are cooperably arranged to produce a sustained tension on the strip 220 as it passes therethrough, highest tension on the strip being produced at the pass formed by rollers 9 and 77 in accordance with theory hereinafter pointed out.

The rollers are also arranged to provide a substantial compression on the strip at the place of highest tension, and this may be effectively produced by urging one or both rollers 9 and 77 in direction toward the other to compress the sheet at the pass formed by such rollers.

Inspection of Figures 22 and 24 will show that the sheet passes over portions of the rollers 9 and 77 and assumes the form of an S curve with the point of contraflexure 304 disposed at the pass so as to provide abrupt change in flexure at the place of highest tension and compression. Thus, several methods of stress-relieving metal have been combined to work over a very short portion of the strip so as to coordinate all available means to one end.

Instead of tilting one set of rollers 74, 77 toward the other set 8, 9 as disclosed hereinbefore, all rollers in the construction shown in Figures 22 and 23 preferably remain bodily stationary except rollers 77 and 79. The strip 220 moves from left to right as indicated by the arrow in Figure 22, and initially the rollers 77, 79 are in a lower position so that roller 77 is out of engagement with rollers 9 and 74. The leading end of the strip is guided over roller 77 (in its lowered position) and any suitable control (not shown) such as a limit switch, electric eye, or other control apparatus may be positioned at a preselected location at or near the pass formed by the rollers 78 and 300 so as to be influenced by the leading end and to automatically start mechanism which gradually brings rollers 77 and 79 into their working positions as shown.

The mechanism for moving rollers 77 and 79 to their working position may be a cylinder-toggle mechanism of conventional type, or may be an electric motor which turns a crankshaft as herein shown. Such crankshaft mechanism may be driven by a motor through a drive of high reduction so that bodily movement of rollers 77, 79 into working position will cause very little or no speed variation in rollers 8, 9 while the portion of the strip which is suspended between rollers 8, 9, and 78, 300 is lengthened and flexed into S form.

Initially, rollers 74, 77, 79, 78 and 300 may be idle and free to follow the speed of the strip entering therebetween until the rollers 77 and 79 have reached their working position, at which time all of these rollers may be positively rotated by controlled means. While the rollers 77 and 79 move into working position, the leading end of the strip may be held in the pass by means of suitable guides, such as guides 309 shown in Figure 22. Rollers 8, 9 and 32 may be driven by a separate motor, similar to the arrangement as shown in Figures 1 and 2, or the drive for these rollers may be combined with the drive for the other rollers through a clutch which is automatically engaged when rollers 77 and 79 have reached their working position.

Preferably, rollers 9, 32, 74 and 78 may be generally fixed in their relative positions while rollers 8 and 300 may be adjustable so as to accommodate different thicknesses of strip in accordance with the capacity of the apparatus. As herein disclosed, rollers 77 and 79 may be guided in movement toward rollers 9 and 74, such guiding however providing for limited free movement of the rollers 77, 79 so that roller 77 may find its working position between rollers 9 and 74.

Figure 20 indicated tension forces acting at various places along the strip and the direction of the resultant reactions acting on rollers 9 and 77. However, the other forces acting on the strip and rollers were not indicated, such as the compression acting on the strip between rollers 9 and 77, or between rollers 8 and 9 or 74 and 77, nor were other reactions shown such as the reactions on the back-up rollers 79 and 32 resulting from the above mentioned compression forces on the strip.

In Figure 24, for reasons of simplicity, only the forces resulting from the compression on the strip have been indicated in order to illustrate the wedging action taking place between the rollers themselves as well as the action between the rollers and the strip. Any tension in the strip will have a tendency to force roller 9 against back-up roller 32 and roller 77 against back-up roller 79 with a major component along T2, as shown in Figure 24, which, if the back-up rollers 32 and 79 are not permitted to yield, will result in a still greater compression force R than that resulting from the pressure alone.

The spacing of the various rollers forming passes for the strip is limited to a size slightly smaller than the thickness of the strip to be processed so that compression forces will result, the relative magnitude and direction of which are indicated by vectors P8, P9, P74, P77 and resultant R, the latter of which compresses the surfaces of the strip between rollers 9 and 77.

Figure 24 shows the relative arrangement of the rollers and strip in exaggerated relation to more clearly indicate the actions involved. As shown, the strip 220 is wrapped in a substantial S-form about portions of the rollers 9 and 77 and compression forces are indicated as applied at points 303, 304 and 305.

Figure 30:
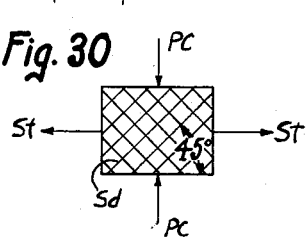

The material at point 304 is subjected to a substantially axial tensile stress and a normal compression stress, the combined effect of such stresses greatly contributing to the breakdown of the resistance of the material to deformation by producing shear as expressed by Mohr's formula (as illustrated in Figure 30) for initial plastic flow, $$sd = \frac{st + pc}{2}$$

where $sd$ is maximum shear stress and $st$ and $pc$ are the principal tensile and compression stresses respectively. Another contributing factor to the thorough working of the material is the sudden change in the direction of flexural stresses by abruptly bending the material in opposite directions at point 304. The advantage of this method of processing strip, therefore, consists in coordinating the forces working on the strip so that maximum tensile and compression stresses will combine at a portion of the strip which also is subjected to abrupt change in flexural stresses, while the methods employed heretofore, may consist in the exerting of compression on the strip at one location, applying maximum tension to the strip at another location and flexing the strip at still other locations. Other advantages may be observed in the arrangement of the rolls, inasmuch as rolls 9 and 77 thru the sheet are wedged against each other and their respective cooperating restraining rolls 8 and 74. If, for instance, back-up rollers 32 and 79 have been preset so as to deflect the central part of working rolls 9 and 77 toward the sheet and each other, a greater compressive force and deeper adjoining, reverse flexures have been obtained over the central portion of the strip than at the edges. In ordinary levelers no such deeper, adjoining, reverse flexures are obtainable in combination with substantial compression and grip at the ends of such flexures as it would not be possible to enter the strip between such rolls without moving at least one of the rolls away in order to permit the strip to enter between the rolls. Other types of levelers have one or more rolls removed from the pass, when the strip enters, but have no provision for tensioning and flexing the strip into adjoining reverse curves about the surfaces of two working rolls (9, 77), so that the strip is compressed between said working rolls and pinched at the opposite ends of said reverse curves by cooperative pinch rolls (8, 74), each of the first mentioned working rolls (9, 77) being wedged between the other working roll and its cooperating restraining roll. Another contributing factor to the wedging action mentioned is that the back up rollers 32 and 79 may be set so as to preload or deflect the working rolls 9 and 77 in a direction and to compress and pinch the sheet more over the central portion than at the edges.

As before pointed out, tension in the strip is obtained by rotating the rollers 74, 77, 78, 79 and 300, and any rollers thereafter, at slightly higher circumferential speed than rollers 8, 9 and 32, and this may be accomplished by electrical means by employing a motor and a drag generator for driving the faster and the slower rollers respectively, or it may be accomplished by a hydraulic coupling, or any other suitable means, so long as there is a flexible connection between the driving means. It may be pointed out that roll 77 is rolling on the convex side of the strip as the latter travels toward pass 304. The convex side being longer, the roll 77 may have a surface speed which is equal to that of a roll rotating at the same speed as roll 9, but having a diameter equal to to slightly larger than the diameter of roll 9 plus twice the thickness of the strip at pass 304.

As a further means of increasing tension in the strip, a pay-off reel and a tension reel may be employed at the respective entering and leaving ends of the apparatus. The rotation of the tension reel would have to be flexible enough so as to help build up a higher maximum tension at point 304.

Accordingly, from the foregoing, it will be evident that an initial tension T1 at point 303 in the strip is caused by frictional engagement between rollers 8 and 9 which run at slightly lower speed than rollers 77, 74, and such initial tension may also be partly caused by the tension from a pay-off reel, if such is used.

Figure 25:
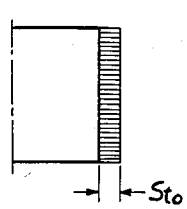
Figs. 25 through 30 are diagrams generally illustrating stress conditions at various places in the sheet as it passes through the leveler apparatus.
Figure 26:
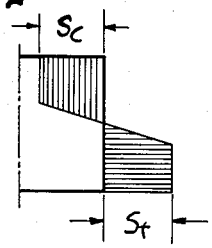

As the strip is flexed about the roller 9, bending stresses will be introduced in the strip which, by themselves, will cause tension on the convex side of the strip and compression on the concave side of the strip with stresses decreasing from the outer fibres toward the neutral axis of the section. Combined with tension in the strip, however, the greater portion of the section would be under tension, as indicated in the stress diagram in Figure 27. Fig. 25 shows a stress diagram when the strip is subjected to axial tension only, and Fig. 26 shows a stress diagram when only flexure takes place. $St_0$ indicates tensile stress, $s_c$ indicates compression stress at the yield point of the material and $st$ indicates tensile stress at the yield point of the material.

Figure 27:
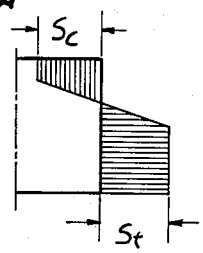
Figure 28:
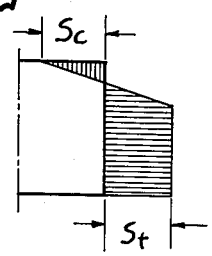
Figure 29:
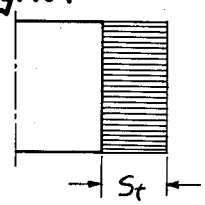

As in any brake drum the magnitude of the friction force will accumulate from point 304 to 303 which causes the tension to increase in the strip as indicated in the stress diagram in Figure 28, taken at a point closer to the pass at 304 than is shown in Figure 27 until maximum tension is reached at pass 304, the approximate stress diagram of which is shown in Figure 29. After pass 304, the strip is flexed in the opposite direction and the tension again decreases as the frictional engagement with the roller 77 builds up.

Maximum tension will, therefore, occur at pass 304 and since substantial compression also has been provided at this point, the two combine to make this the most thoroughly worked section of the strip. In addition, since the roller 77 has greater surface speed than roller 9 to accommodate the elongation of the strip as it is being processed, the strip will be subject to a stretching action produced by the fact that one side of the strip prior to pass 304 was elongated more on the convex side, and at pass 304 such elongation is picked up by the faster running roller 77 to maintain this elongation. After pass 304, the opposite side of the strip is elongated since such side is then the convex side by reason of reversed flexure. Thus, the sudden change in the direction of the flexure will take place at the same point as maximum tension T2 and compression R and all the forces combine to thoroughly work the metal at this section. It is to be understood that the apparatus also may be built without providing for variation of the surface speed of the rollers, as the features of severe reverse adjoining flexures combined with the compression and mutual backing up of the rollers in themselves will be of benefit in the leveling of sheet metal and provide for a less expensive apparatus.

With particular reference to the apparatus shown in Figures 22 and 23, the rolls 32, 9, 74 and 78 may be carried by bearings which provide for little, if any, translational adjustment of such rolls. The bearings for roll 8 may be adjusted by means of screws 326 which turn in screw boxes 327 to provide for adjustment of the roll 8 toward and away from the roll 9 to accommodate various sheet thicknesses. Roll 300 may be similarly carried and adjusted by screw boxes 327 and screws 326 for movement toward and away from roll 78.

Rolls 77 and 79 are journalled between the arms of a pair of spaced yokes 307 and the yokes are respectively journalled to the cranks of a crankshaft 306, the latter being rotatively carried by opposite sides 311, 312 of the housing.

As best seen in Figure 23, the roll 79 which forms the back-up for roll 77 is preferably made in three sections to provide for sufficient rigidity. Rollers 322 are journalled on opposite ends of the shaft that carried roll sections 79, each roller 322 being respectively confined to movement between spaced guides which are here shown as spaced ribs 321 extending inwardly from sides 311, 312. Each roller is of slightly less diameter than the spacing of the ribs for a purpose hereinafter disclosed.

The crankshaft 306 may be driven by any suitable power means (such as a motor) connected to a coupling 324. It will be obvious that the crankshaft may be rotated so that the roll 77 is withdrawn from working relation with the rolls 9 and 74 so that the leading end of a sheet may be threaded into the apparatus. When the leading end of the sheet has reached a predetermined entered position, automatic means, as before referred to, may effect operation of the power means to rotate the crankshaft and cause the roll 77 to move in a direction toward the rolls 9 and 74.

Engagement of the rollers 322 with the guides 321 will direct the roll 77 to general relation with the rolls 9 and 74, the play between rollers 322 and guides 321 providing sufficient lateral movement so that the roll 77 may find its proper working position between rolls 9 and 74.

Movement of the roll 77 (and its associated back-up roll 79) to working position will therefore flex the sheet into the S-form shown in Figures 22 and 24 and will also provide for compression of the sheet at points 304 and 305, and the apparatus is set for continuous processing of a sheet of any length as hereinbefore described.

It will be observed that back-up rollers 79 are driven through flexible coupling 323 and that the roller 77 is driven by the same shaft 340 as rollers 79, through gears 319 and 319a. The pitch diameters of gears 319, 319a are equal to the diameters of rollers 77, 79 respectively.

From the foregoing, it will be appreciated that my improved apparatus and method provides many advantages over apparatus and methods of the prior art. For example, by combining compression, tension and flexing of the sheet, the formation of longitudinal bulges and wrinkles in a sheet under longitudinal tension is prevented by compression of the sheet between the rolls. Thus, a disadvantage of the usual stretcher leveler is overcome. Also, flexing of the sheet over rolls immediately prior to and subsequent to the region of maximum tension tends to prevent the formation of bulges and wrinkles. Further, the compression (and optionally, the reduction) of the sheet in the region of maximum tension acts to render the tensile pull more effective in stretching the sheet. Also, the total power requirement for working the sheet in the manner herein disclosed will be less than if flexing, tensioning and compressing operations of the sheet were performed sequentially, and the sheet is more thoroughly worked and accordingly is more efficiently and satisfactorily processed.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A leveler apparatus including in combination, a feed roller for passing material to be leveled; a pair of rollers adjacent said roller for receiving and gripping said material therebetween; means forming supports for said pair of rollers; means for moving the first mentioned means relative to said roller for stretching the material intermediate said roller and pair of rollers; and means controlled by the movement of said material for causing movement of the first mentioned means from one position to another position when the material enters between said pair of rollers and for causing the first mentioned means to return to said one position after the material has passed between said rollers.

2. A leveler machine comprising in combination, a material feed roller; a frame; a plurality of sets of rollers supported by said frame, each of said sets comprising an upper and lower roller cooperating for leveling and passing material from said feed roller therebetween; at least one of the rollers of said upper and lower rollers being movable toward and away from a cooperating roller; means for pivotally supporting said frame; means for tilting said frame about its pivot toward and away from said feed roller; means actuated by said movable roller for rendering the second mentioned means operative for tilting said frame in one direction; and means for driving one or more of said rollers.

3. In a leveler apparatus, a frame; a plurality of rollers mounted in the frame; means for tilting the frame about an axis; and driving means for said rollers, including a gear train and a gear adapted to drive the gear train, said gear being mounted on an axis substantially in alignment with the first mentioned axis.

4. In a leveler apparatus, a frame; a plurality of rollers mounted in the frame; means for tilting the frame about an axis; and driving means for said rollers, including a gear train and a gear adapted to drive the gear train, said gear being mounted on an axis substantially in alignment with the first mentioned axis, said driving means being tiltable with said frame whereby said gear train is tiltable about said gear.

5. A sheet leveler including, a set of feed rollers for gripping a sheet therebetween and a set of working rollers for gripping a sheet therebetween; means for mounting one of said sets for translational movement relative to the other set, said one set being movable by said means to a position in alignment with and spaced from the other set whereby a sheet passing through said feed rollers extends between said working rollers, said means being adapted to move said one set toward the other set and laterally with respect to the path of movement of the sheet passing from the feed rollers whereby the portion of the sheet extending between the two sets of rollers is tensioned and flexed about a portion of the periphery of a roller of said one set of rollers; and means for driving one or more of said rollers.

6. A sheet leveler including, a set of feed rollers for gripping a sheet therebetween and a set of working rollers for gripping a sheet therebetween; means for mounting the working set of rollers for translational movement relative to the feed rollers, said working rollers being movable by said means to a position in alignment with and spaced from the feed rollers whereby a sheet passing through the feed rollers extends between said working rollers, said means being adapted to move said working rollers toward the feed rollers and laterally with respect to the path of movement of the sheet passing from the feed rollers whereby the portion of the sheet extending between the two sets of rollers is tensioned and flexed about the peripheries of a feed roller and work roller; and means for driving one or more of said rollers.

7. A sheet leveler including, a set of feed rollers for gripping a sheet therebetween and a set of working rollers for gripping a sheet therebetween; means for mounting the working set of rollers for translational movement relative to the feed rollers, said working rollers being movable by said means to a position in alignment with and spaced from the feed rollers whereby a sheet passing through the feed rollers extends between said working rollers, said means being adapted to move said working rollers toward the feed rollers and laterally with respect to the path of movement of the sheet passing from the feed rollers whereby the portion of the sheet extending between the two sets of rollers is tensioned and flexed about the peripheries of a feed roller and work roller; means responsive to the passage of said sheet between the working rollers for actuating the first mentioned means to move said one set of rollers from the first mentioned position to the second mentioned position; and means for driving one or more of said rollers.

8. A sheet leveler including, a set of feed rollers adapted to grip a sheet therebetween; a set of work rollers adapted to receive a sheet fed from said feed rollers and to grip the sheet therebetween; means for mounting one of said sets of rollers for translational movement relative to the other of said sets; power means for moving said mounting means for establishing a tension on the portion of the sheet extending between said sets of rollers; and means for driving one or more of said rollers.

9. A sheet leveler including, a set of feed rollers adapted to grip a sheet therebetween; a set of work rollers adapted to receive a sheet fed from said feed rollers and to grip the sheet therebetween; means for mounting one of said sets of rollers for translational movement relative to the other of said sets, said mounting means being movable in a direction for moving said one set of rollers laterally with respect to the normal path of movement of the sheet passing from said feed rollers; power means for moving said mounting means in said direction thereby establishing a tension on the portion of the sheet intermediate the two sets of rollers throughout the cross-sectional area of the sheet and for flexing said sheet about one of said working rollers; and means for driving one or more of said rollers.

10. A sheet leveler including, a set of feed rollers adapted to grip a sheet therebetween; a set of work rollers adapted to receive a sheet fed from said feed rollers and to grip the sheet therebetween; means for mounting one of said sets of rollers for translational movement relative to the other of said sets, said mounting means being movable in a direction for moving said one set of rollers laterally with respect to the normal path of movement of the sheet passing from said feed rollers and toward one of said feed rollers for compressing said sheet between said one feed roller and a work roller; power means for moving said mounting means in said direction thereby establishing a tension on the portion of the sheet intermediate the two sets of rollers throughout the cross-sectional area of the sheet and for flexing and compressing said sheet between a working roller and a feed roller; and means for driving one or more of said rollers.

11. Apparatus for working sheet metal, comprising: a first pair of rollers for forming a main pass to compress and work the sheet; two back-up rollers each engaging one roller of said first pair for supporting the same; two restraining rollers supported independently of such back-up rollers and cooperable with respective rollers of said first pair of rollers to compress the sheet therebetween and thus provide restraining passes on opposite sides of said main pass; means for mounting at least one of said first pair of rollers and its respectively associated back-up roller for translational movement as a unit relative to the other roller of the pair whereby said one roller may be retracted from working relation with respect to said other roller to provide a gap therebetween of a size larger than said main pass; and means for moving said one roller relative to said other roller and generally laterally with respect to the path of movement of the sheet to flex that portion of the sheet intermediate said restraining passes about a portion of the peripheral surface of each of said first pair of rollers.

12. Apparatus for working sheet metal, comprising: a first pair of rollers for forming a main pass to compress and work the sheet; two restraining rollers cooperable with respective rollers of said first pair of rollers to compress the sheet therebetween and thus provide restraining passes on opposite sides of said main pass; means for mounting at least one of said first pair of rollers for translational movement relative to the other whereby said one roller may be retracted from working relation with respect to said other roller to provide a gap therebetween of a size larger than said main pass; means for moving said one roller relative to said other roller and generally laterally with respect to the path of movement of the sheet to flex that portion of the sheet intermediate said restraining passes about a portion of the peripheral surface of each of said first pair of rollers; and means responsive to the passage of said sheet relative to said one roller to effect operation of said roll moving means.

13. Apparatus for working sheet metal, comprising: a pair of first rollers for forming a main pass operative to compress the sheet; two restraining rollers cooperable with respective rollers of said first rollers to provide restraining passes on opposite sides of said main pass; means for mounting at least one of said first rollers for translational movement relative to the other; means for selectively sustaining said one roller relative to said other roller to establish said main pass; and means for controlling the relative speed of said first pair of rollers to maintain tension in the portion of the sheet extending between said restraining passes.

14. Apparatus for working sheet metal, comprising: first and second rollers for forming a main pass operative to compress the sheet; two restraining rollers, one being cooperable with said first roller to form a sheet-entering restraining pass and the other being cooperable with said second roller to form a sheet-leaving restraining pass on the opposite side of said main pass; means for sustaining said second roller relative to its restraining roller and said first roller to respectively establish said main pass and said sheet-leaving pass; and means providing for movement of said second roller and its restraining roller at greater peripheral speed than said first roller and its restraining roller to maintain tension in that portion of the sheet extending between said restraining passes.

15. The method of working sheet metal which comprises moving the sheet through a pass and flexing the sheet in reverse adjoining curves on opposite sides of said pass with the point of contraflexure at said pass, tensioning the sheet along said reverse curves and establishing maximum tension at said pass, and squeezing the sheet at said pass to provide sustained compression on the sheet which coincides with said maximum tension so as to combine with the latter to stress the sheet metal beyond its elastic limit as it advances through said pass.

16. A method of working sheet metal which comprises advancing the sheet over a peripheral portion of a first roller and moving it through a pass formed by said first roller and a second cooperating roller and advancing the sheet over a peripheral portion of said second roller, holding said sheet in frictional engagement with said roller portions to flex the sheet into two adjoining reverse curves with the point of contraflexure of the sheet located at said pass, and controlling the relative peripheral speed of said rollers to establish tension in that portion of the sheet flexed over said roller portions with maximum tension at said pass, and holding said rollers in position to provide and maintain a pass size smaller than the sheet thickness to exert compression which coincides with said maximum tension and combines with the latter to stress the sheet beyond its elastic limit as the sheet is advanced through said pass.

17. A method of working sheet metal which comprises advancing the sheet over a peripheral portion of a first roller and moving it through a pass formed by said first roller and a second cooperating roller and advancing the sheet over a peripheral portion of said second roller, holding said sheet in frictional engagement with said roller portions to flex the sheet into two adjoining reverse curves with the point of contraflexure of the sheet located at said pass, rotating said second roller at greater peripheral speed than said first roller to establish tension in that portion of the sheet flexed over said roller portions with maximum tension at said pass, and holding said rollers in position to provide and maintain a pass size smaller than the sheet thickness to exert compression which coincides with said maximum tension and combines with the latter to stress the sheet beyond its elastic limit as the sheet is advanced through said pass.

18. A method of working sheet metal which comprises advancing and tensioning the sheet over peripheral portions of two cooperating rollers and through a pass formed by said rollers, holding said sheet in frictional engagement with said roller portions to flex the sheet into two adjoining reverse curves with the point of contraflexure of the sheet located at the pass between the rollers, moving one roller relative to the other in the direction of sheet travel at the pass to augment the tension in the sheet so that the tension in the portion of said sheet flexed over one roller leading to the pass progressively increases to a maximum at said pass and thereafter progressively decreases in the sheet portion flexed over the other roller leading away from said pass, and holding the rollers in a working position to provide and maintain a pass size smaller than the sheet thickness to exert a compression which coincides with said maximum tension and combines with the latter to stress the sheet beyond its elastic limit as the sheet is advanced through said pass.

19. A method of working sheet metal which comprises advancing the sheet over a peripheral portion of a first roller and moving it through a pass formed by said first roller and a second cooperating roller and advancing the sheet over a peripheral portion of said second roller, holding said sheet in frictional engagement with said roller portions to flex the sheet into two adjoining reverse curves with the point of contraflexure of the sheet located at the pass beween the rollers, rotating said second roller at greater peripheral speed than said first roller so that tension in the portion of said sheet flexed over said first roller and leading to the pass progressively increases to a maximum at said pass and thereafter progressively decreases in the sheet portion flexed over said second roller leading away from said pass, and holding the rollers in position to provide and maintain a pass size smaller than the sheet thickness to exert a compression which coincides with said maximum tension and combines with the latter to stress the sheet beyond its elastic limit as the sheet is advanced through said pass.

20. Apparatus for working sheet metal, comprising: a pair of feed rollers adapted to grip the sheet therebetween, a restraining roller spaced from said feed rollers, a working roller mounted for generally reciprocatory movement relative to said feed rollers and said restraining roller, means for moving said working roller to wedge the same between one of the feed rollers and said restraining roller, the working roller in such wedged position forming a main pass with said one feed roller of smaller size than the cross section of the sheet and a restraining pass with the restraining roller to grip the sheet as it leaves such main pass, and means for driving said working roller and said restraining roller at great peripheral speed than said feed rollers thereby to maintain tension in the sheet at the main pass.

21. Apparatus for working sheet metal, comprising: a pair of feed rollers adapted to grip the sheet therebetween, a restraining roller spaced from said feed rollers, a working roller and a back-up roller therefor mounted for generally reciprocatory movement as a unit relative to said feed rollers and said restraining roller, power means operative to move said working roller and its back-up roller to wedge the working roller between one of the feed rollers and said restraining roller, the working roller in such wedged position forming a main pass with said one feed roller of smaller size than the cross section of the sheet and a restraining pass with the restraining roller to grip the sheet as it leaves such main pass, and means for driving said working roller and said restraining roller at greater peripheral speed than said feed rollers thereby to maintain tension in the sheet at the main pass.

22. Apparatus for working sheet metal, comprising: a pair of feed rollers adapted to grip the sheet therebetween, a restraining roller spaced from said feed rollers, a working roller and a back-up roller therefor mounted for generally reciprocatory movement as a unit relative to said feed rollers and said restraining roller, power means operative to move said working roller and its back-up roller to wedge the working roller between one of the feed rollers and said restraining roller, the working roller in such wedged position forming a main pass with said one feed roller of smaller size than the cross section of the sheet and a restraining pass with the restraining roller to grip the sheet as it leaves such main pass, means responsive to the passage of the leading edge of the sheet beyond the thus formed restraining pass to effect operation of said power means, and means for driving said working roller and said restraining roller at greater peripheral speed than said feed rollers thereby to maintain tension in the sheet at the main pass.

23. Apparatus for working sheet and strip metal, comprising: a first working roll, a second working roll opposed thereto to define a metal working pass therebetween, a back-up roll for each of such working rolls, two restraining rolls supported independently of such back-up rolls cooperable with the respective working rolls to form restraining passes on opposite sides of said metal working pass, the back-up roll and restraining roll associated with each working roll being spaced apart a distance less than the diameter of such working roll and means for positioning at least one working roll and its back-up roll as a unit relative to the other working roll.

24. A leveler apparatus for sheet material comprising, in combination, a set of pinch rollers arranged to pass the work generally horizontally therethrough, a frame, a set of leveler rollers supported by said frame in two substantially parallel rows adjacent said pinch rollers at one end, and means mounting said frame for tilting movement relative to said pinch rollers from a rest position in which the work opening at such end of the leveler rollers is substantially in the same plane as the opening of the pinch rollers and such rows extend at an angle therefrom to a working position in which the rows are horizontal with the opening thereof spaced vertically from the pinch roller opening, whereby tilting the frame to working position after the work has been engaged both by the pinch and leveler rollers will tension the same in the space intermediate the two roller sets.

25. The method of working sheet metal which comprises flexing and tensioning the sheet over a peripheral portion of a first roll, squeezing the sheet in a pass between said first roll and a second roll, flexing and tensioning the sheet over a peripheral portion of said second roll, and rotating said second roll at greater peripheral speed than said first roll.

References Cited in the file of this patent

UNITED STATES PATENTS

| | | |
|---|---|---|
| 1,238,002 | Coryell | Aug. 21, 1917 |
| 1,433,138 | Kruse | Oct. 24, 1922 |
| 1,750,471 | Hoover | Mar. 11, 1930 |
| 1,815,484 | Schmitz | July 21, 1931 |
| 1,841,824 | Kruse | Jan. 19, 1932 |
| 2,004,596 | Biggert, Jr. | June 11, 1935 |
| 2,006,087 | Miller | June 25, 1935 |
| 2,078,711 | Hudson | Apr. 27, 1937 |
| 2,096,713 | Freeze | Oct. 26, 1937 |
| 2,163,504 | Thomas | June 20, 1939 |
| 2,221,696 | Sutton | Nov. 12, 1940 |
| 2,256,520 | Johansen et al. | Sept. 23, 1941 |
| 2,343,899 | Groll et al. | Mar. 14, 1944 |
| 2,504,292 | Anderson | Apr. 18, 1950 |

FOREIGN PATENTS

| | | |
|---|---|---|
| 1,308 | Great Britain | of 1856 |
| 463,374 | Great Britain | Mar. 30, 1937 |